(No Model.)

D. GOLDEN.
Corn Planter.

No. 231,558. Patented Aug. 24, 1880.

Witnesses:
M. M. Lacey
J. B. Holderby

Inventor.
Dominic Golden
By R. S. & A. T. Lacey Attys.

United States Patent Office.

DOMINIC GOLDEN, OF ANTIGO, WISCONSIN.

CORN-PLANTER.

SPECIFICATION forming part of Letters Patent No. 231,558, dated August 24, 1880.

Application filed March 15, 1880. (No model.)

*To all whom it may concern:*

Be it known that I, DOMINIC GOLDEN, a citizen of the United States, and residing at Antigo, in the county of New and State of Wisconsin, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of corn-planters in which the opening of the furrow, the dropping and covering of the seed, and the marking of the place for the next row are all done automatically by the machine.

It consists in the construction and arrangement of the several parts, by which they act simultaneously, as will be hereinafter fully explained, and pointed out in the claims.

Figure 1:
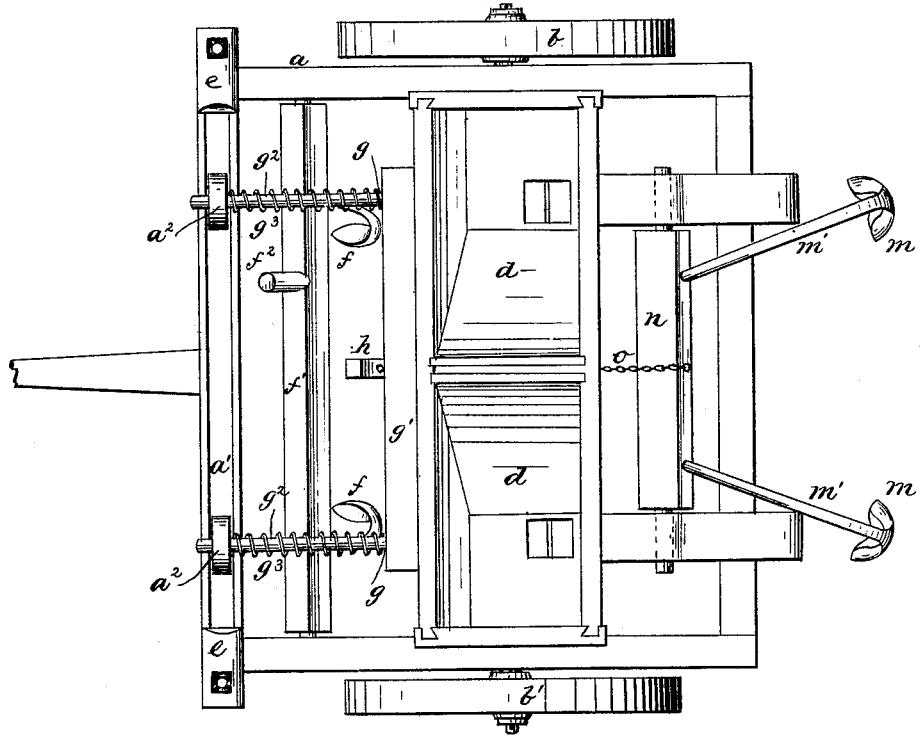
Figure 2:
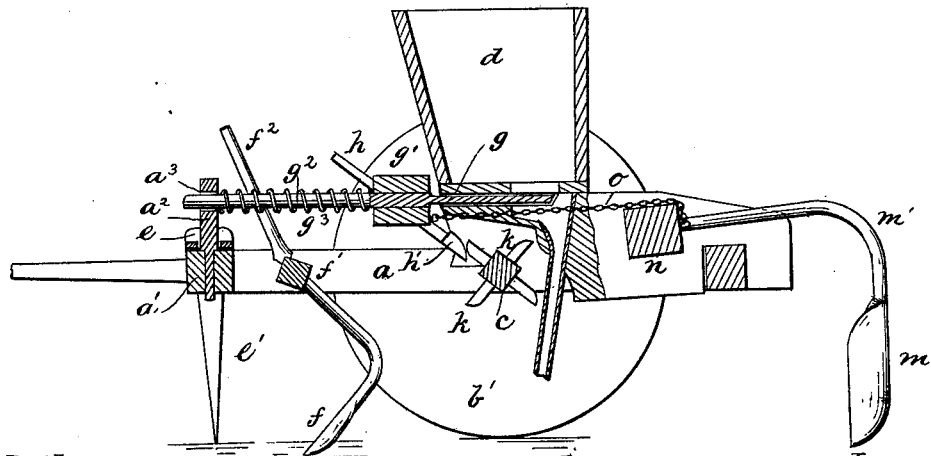

In the drawings, Figure 1 is a plan, and Fig. 2 is a vertical longitudinal section, of a machine constructed according to my invention.

$a$ is the main frame. $b\ b'$ are the wheels, supported on the axle $c$, which is journaled in the frame $a$.

On the front bar, $a'$, of the frame $a$, I place two guides, $a^2\ a^2$, arranged in line with the openings in the bottoms of the hoppers $d\ d$, and in these guides I form holes $a^3$, through which the shafts of the dropping-slides are put. On top of the bar $a'$, I place a marking-bar, $e$, which is slotted, so that it slips over the guides $a^2$ and slides laterally thereon for purpose of adjustment to mark on one or the other side of the machine.

In the end of the marking-bar I place the marker $e'$, which is held in its place with capability of easy removal, so that it can be transferred from one end of the said bar to the other. When the machine has been moved across the field and is reversed to bring it back the bar $e$ is slipped laterally, so as to throw the marker into place on that side of the frame opposite to the planted ground. The bar $e$ may be fastend by any suitable key or device which will prevent its being slipped laterally by the force exerted on the end of the marker.

$f\ f$ are openers, which are fixed on a rotating shaft, $f'$, journaled in the frame $a$. The openers are arranged in front of the grain-boxes, and they may be set to run deeper or shallower by the lever $f^2$, which may be held fixed in any desired position by any of the ordinary ratchet-bars or other devices commonly employed on planters for holding the operating-levers.

$g\ g$ are the dropping-slides, arranged to slide into bearings in the bottoms of the grain-boxes $d\ d$ and receive and drop the requisite amount of seed into the spouts, which convey it into the furrows formed by the openers $f\ f$. The slides $g\ g$ are both, by preference, fixed in the cross-head bar $g'$, so that they operate simultaneously and drop two hills at the same time. To each side I attach a shaft or stem, $g^2$, which extends directly forward and passes through the opening $a^3$ in the guides $a^2$. Around the stems $g^2$, I place the coil-spring $g^3$, which bears against the head-bar $g'$ and against the guides $a^2$. At the center of the head-bar $g'$, I attach an arm, $h$, on the end of which is formed a head-piece, $h'$, which is beveled or made cam-shaped on its upper side, as shown. The arm $h$ is attached to the head-bar $g'$, so that it can be adjusted to throw the head $h'$ toward or away from the axle $c$, as may be desired.

$k\ k$ are a series of short arms fixed on the axle $c$, arranged on the same circumferentially and at equal distances apart, as shown. They have their outer ends beveled, and they are arranged so that they will strike the head $h'$ of the arm $h$ as the axle $c$ is revolved by the forward movement of the planter.

The arms $k$ are attached with capability of easy removal, so that one or more of them may be removed when it is desired to drop the hills at greater distances apart. The throw or extent of the movement of the slides $g$ is regulated by setting the arm $h$ nearer to or farther away from the axle $c$. The arm $h$ can be set so that contact between it and the arms $k$ will be very slight and the movement of the slides very limited, as will be readily understood.

$m\ m$ are the coverers. They are connected by suitable curved arms $m'\ m'$ to a rotating shaft, $n$, which is journaled in the side bars of the frame $a$, and in rear of the hoppers $d\ d$. The coverers are arranged in the same longitudinal line with the openers $f$ and dropping-slides $g$, so that they will cover the grain dropped. They are also arranged in rear of the delivery-spouts of the grain-boxes, at a distance equal to the distance between two hills, so that at the moment one hill is dropped they will fall, as hereinafter explained, and cover the previously dropped hill. The arms $m'$ are attached to the shaft $n$, so that they may be slipped up and fastened, and thereby reduce the distance between the coverers and the delivery-spouts, or may be slipped outward and lengthen said distance, as may be desired.

$o$ is a chain, which has its rear end fixed to the rear side of the shaft $n$, while its other end is passed under the grain-boxes and fastened to the head-bar $g'$, as shown. When one of the arms $k$ strikes the head $h'$ of arm $h$ the bar $g'$ is thrown forward, moving the slides $g$, and a hill of corn is dropped. The forward movement of the bar $g'$ draws the chain $o$ and turns the shaft $n$, which lifts the coverers $m$ when the arm $k$ has cleared the end of the arm $h$. The springs $g^3$ instantly throw back the bar $g'$, which movement closes the slides $g$ and lets the coverers drop to the ground. The forward movement of the machine being continued, the same movements of the several parts takes place, and when the coverers descend the second time they cover the first hill that was dropped, and thus the planting may be continued entirely across the field.

In the ordinary planters the coverers drag continuously in the earth; but in my machine the coverers act like hoes, cutting into the ground only at the moment the grain is to be covered. This makes the draft lighter, and in ground that is a little hard the plunging movement of the coverers will throw the dirt over the grain far better than can be possibly done by the ordinary drag-coverers.

I am aware that it is not new to operate the reciprocating seed-slides by means of a gear-wheel attached to the forward axle, actuating a pinion connected to cranks, to which are attached rods that move levers connected with the said slides, nor to cover the seed by means of shares attached to arms or levers hinged to the planter-frame and automatically raised by cams or pins fixed on the axle, all of which is shown in the patents to W. Y. Henry, November 2, 1858, No. 21,959, and to J. A. C. and A. S. Hickman, September 3, 1861, No. 33,197, and I do not claim such as my invention.

Having thus fully described my invention, what I claim as new, and desire to secure by Letters Patent, is—

In a corn-planter, the combination of the slides $g$, having the shafts $g^2$, springs $g^3$, the head-bar $g'$, adjustable arm $h$, chain $o$, revolving shaft $n$, coverers $m$, having their arms $m'$ fixed in the shaft $n$, guides $a^2$, and axle $c$, having the actuating pins or arms $k$, all arranged to operate substantially as and for the purposes set forth.

In testimony that I claim the foregoing I have hereunto set my hand this 10th day of March, 1880.

DOMINIC GOLDEN.

Witnesses:
HARRY W. GILL,
FRANK B. WESCKATH.